United States Patent
Douglas et al.

(10) Patent No.: US 9,260,996 B2
(45) Date of Patent: Feb. 16, 2016

(54) EXHAUST SYSTEM AND METHOD FOR CONTROLLING AN EXHAUST SYSTEM

(75) Inventors: Scot A. Douglas, Howell, MI (US); Patrick Barasa, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 488 days.

(21) Appl. No.: 13/355,102

(22) Filed: Jan. 20, 2012

(65) Prior Publication Data

US 2013/0186063 A1    Jul. 25, 2013

(51) Int. Cl.
| | |
|---|---|
| *F01N 3/00* | (2006.01) |
| *F01N 3/025* | (2006.01) |
| *F01N 9/00* | (2006.01) |
| *F02D 41/02* | (2006.01) |
| *F02D 41/14* | (2006.01) |
| *F01N 3/027* | (2006.01) |
| *F02D 41/40* | (2006.01) |

(52) U.S. Cl.
CPC ............... *F01N 3/025* (2013.01); *F01N 3/027* (2013.01); *F01N 9/002* (2013.01); *F02D 41/029* (2013.01); *F02D 41/1446* (2013.01); *F01N 2900/1404* (2013.01); *F02D 41/405* (2013.01); *F02D 2200/0804* (2013.01); *Y02T 10/47* (2013.01)

(58) Field of Classification Search
CPC ......... F01N 9/002; F01N 4/025; F01N 4/027; F02D 41/029; F02D 41/1446; F02D 41/405
USPC .................................... 60/605.1, 272–324
See application file for complete search history.

(56) References Cited

U.S. PATENT DOCUMENTS

| | | | | |
|---|---|---|---|---|
| 5,520,161 | A * | 5/1996 | Klopp | 123/676 |
| 6,601,387 | B2 * | 8/2003 | Zurawski et al. | 60/605.2 |
| 7,337,607 | B2 * | 3/2008 | Hou et al. | 60/274 |
| 8,474,245 | B2 * | 7/2013 | Barasa | 60/286 |
| 2012/0036839 | A1 * | 2/2012 | Barasa et al. | 60/286 |
| 2013/0139504 | A1 * | 6/2013 | Barasa | 60/605.1 |

* cited by examiner

*Primary Examiner* — Jesse Bogue
*Assistant Examiner* — Kelsey Stanek
(74) *Attorney, Agent, or Firm* — Cantor Colburn LLP

(57) ABSTRACT

In one exemplary embodiment of the invention, a method for controlling an exhaust system includes determining an air to fuel ratio within a combustion chamber of an internal combustion engine, measuring a temperature of an exhaust gas flow from the internal combustion engine into the exhaust system and determining a specific heat for the exhaust gas flow in a first segment of the exhaust system based on the temperature of the exhaust gas flow from the internal combustion engine and the air to fuel ratio, wherein the first segment is upstream of the particulate filter. The method also includes determining a first temperature of the exhaust gas in the first segment based on the specific heat for the exhaust gas flow and selectively controlling a regeneration process for the particulate filter using the determined temperature of the exhaust gas at the selected location.

18 Claims, 2 Drawing Sheets

EXHAUST SYSTEM AND METHOD FOR CONTROLLING AN EXHAUST SYSTEM

FIELD OF THE INVENTION

The subject invention relates to exhaust systems and, more specifically, to methods and systems for controlling temperature at one or more selected locations in exhaust systems.

BACKGROUND

An engine control module of an internal combustion engine controls the mixture of fuel and air supplied to combustion chambers within cylinders of the engine. After the air/fuel mixture is ignited, combustion takes place and later the combustion gases exit the combustion chambers through exhaust valves. The combustion gases are directed by an exhaust manifold to a catalytic converter or other components of exhaust aftertreatment systems. Some engines optionally may include a forced air induction device, such as a turbocharger, that is positioned between the exhaust manifold and exhaust aftertreatment components.

Manufacturers of internal combustion engines, particularly diesel engines, are presented with the challenging task of complying with current and future emission standards for the release of oxides of nitrogen, particularly nitrogen monoxide, as well as unburned and partially oxidized hydrocarbons, carbon monoxide, particulate matter, and other particulates. In order to reduce emissions of internal combustion engines, an exhaust aftertreatment system is used to reduce constituents from the exhaust gas.

Exhaust gas aftertreatment systems typically include one or more aftertreatment devices, such as particulate filters, catalytic converters, mixing elements and urea/fuel injectors. Control of the exhaust gas temperature can affect the performance of components within the exhaust system. For example, a particulate filter is configured to remove carbon particles or particulates that result from incomplete combustion of a hydrocarbon fuel, also referred to as soot, from the exhaust gas. Particulate filters are typically designed to accumulate a selected amount of soot within the device. Particulate filters may be configured to periodically burn off the accumulated soot through a regeneration process. The regeneration process may be initiated by increasing a temperature of the exhaust gas entering the particulate filter, wherein the elevated temperature causes the soot to burn. Thus, accurate control of the exhaust gas temperature at selected locations in the exhaust system can lead to improved performance and reduced emissions.

SUMMARY OF THE INVENTION

In one exemplary embodiment of the invention, a method for controlling an exhaust system includes determining an air to fuel ratio within a combustion chamber of an internal combustion engine, measuring a temperature of an exhaust gas flow from the internal combustion engine into the exhaust system and determining a specific heat for the exhaust gas flow in a first segment of the exhaust system based on the temperature of the exhaust gas flow from the internal combustion engine and the air to fuel ratio, wherein the first segment is upstream of the particulate filter. The method also includes determining a first temperature of the exhaust gas in the first segment based on the specific heat for the exhaust gas flow and selectively controlling a regeneration process for the particulate filter using the determined temperature of the exhaust gas at the selected location.

In another exemplary embodiment of the invention, a method for controlling an exhaust system includes determining an air to fuel ratio within a combustion chamber of an internal combustion engine, measuring a temperature of an exhaust gas flow from the internal combustion engine into the exhaust system and determining a specific heat for the exhaust gas flow in a first segment of the exhaust system based on the temperature of the exhaust gas flow from the internal combustion engine and the air to fuel ratio, wherein the first segment is upstream of a particulate filter. The method also includes determining a first temperature of the exhaust gas in the first segment based on the specific heat for the exhaust gas flow and selectively controlling a regeneration process for the particulate filter using the determined temperature of the exhaust gas at the selected location.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
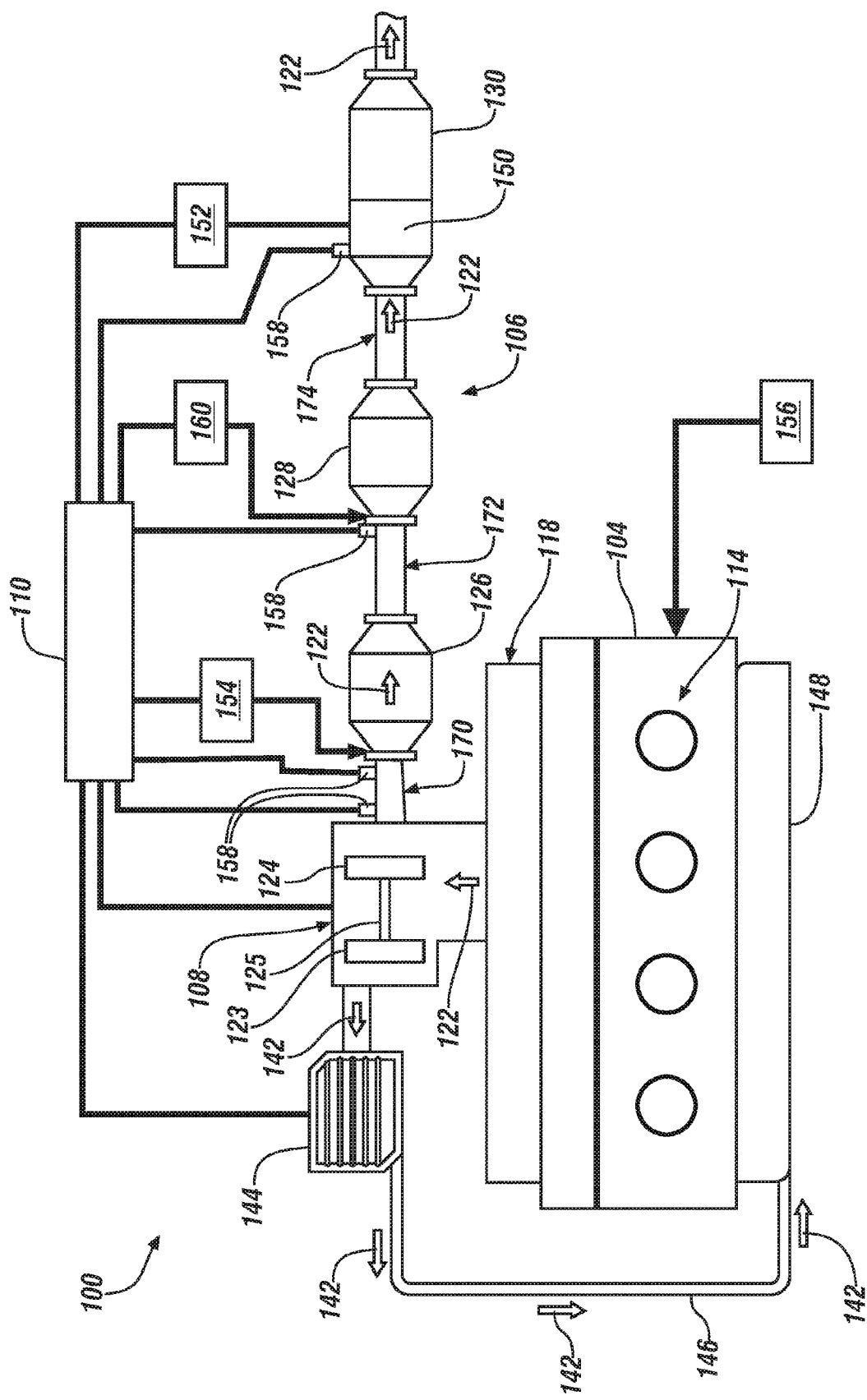
FIG. 1 is a schematic diagram of an exemplary internal combustion engine and associated exhaust system.

The following description is merely exemplary in nature and is not intended to limit the present disclosure, its application or uses. It should be understood that throughout the drawings, corresponding reference numerals indicate like or corresponding parts and features. As used herein the term controller or control module refers to an application specific integrated circuit (ASIC), an electronic circuit, a processor (shared, dedicated or group) and memory that executes one or more software or firmware programs, a combinational logic circuit, and/or other suitable components that provide the described functionality.

In accordance with an exemplary embodiment of the invention, FIG. 1 illustrates an exemplary internal combustion engine 100, in this case an in-line four cylinder engine, including an engine block and cylinder head assembly 104, an exhaust system 106, a turbocharger 108 and a control module 110 (also referred to as "controller"). The internal combustion engine 100 may be a diesel or spark ignition engine. Coupled to the engine block and cylinder head assembly 104 is an exhaust manifold 118. In addition, the engine block and cylinder head assembly 104 includes cylinders 114 wherein the cylinders 114 receive a combination of combustion air and fuel supplied from a fuel system 156. The combustion air/fuel mixture is combusted resulting in reciprocation of pistons (not shown) located in the cylinders 114. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The combustion of the air/fuel mixture causes a flow of exhaust gas through the exhaust manifold 118 and turbocharger 108 and into the exhaust system 106. In an embodiment, the turbocharger 108 includes a compressor wheel 123 and a turbine wheel 124 coupled by a shaft 125 rotatably disposed in the turbocharger 108.

An exhaust gas flow 122 resulting from combustion within cylinders 114 drives the turbine wheel 124 of turbocharger 108, thereby providing energy to rotate the compressor wheel 123 to create a compressed air charge 142. In an exemplary embodiment, the compressed air charge 142 is cooled by a charge cooler 144 and is routed through an intake conduit 146 to an intake manifold 148. The compressed air charge 142 provides additional combustion air (when compared to a non-turbocharged, normally aspirated engine) for combustion with fuel in the cylinders 114, thereby improving the power output and efficiency of the internal combustion engine 100.

The exhaust gas 122 flows through the exhaust system 106 for the removal or reduction of exhaust gas constituents and is then released into the atmosphere. The exhaust system 106 may include catalyst devices, such as oxidation catalyst ("OC") device 126 and selective catalytic reduction ("SCR") device 128, as well as a particulate filter ("PF") 130. The OC device 126 may include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits or passages. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts. The SCR device 128 may also include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate can include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 122 in the presence of a reductant such as ammonia ($NH_3$). An $NH_3$ reductant may be supplied from a fluid supply 160 (reductant supply) and may be injected into the exhaust gas 122 at a location upstream of the SCR device 128 using an injector. The reductant may be in the form of a gas, a liquid, or an aqueous urea solution and may be mixed with air in the injector to aid in the dispersion of the injected spray.

The particulate filter PF 130 may be disposed downstream of the SCR device 128. The PF 130 operates to filter the exhaust gas 122 of carbon and other particulates. In embodiments, the PF 130 may be constructed using a ceramic wall flow monolith filter that is wrapped in an intumescent mat or other suitable support that expands when heated, securing and insulating the filter. The filter may be packaged in a shell or canister that is, for example, stainless steel, and that has an inlet and an outlet in fluid communication with exhaust gas conduits. The ceramic wall flow monolith filter may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 122 entering the filter through the inlet ends of the inlet passages is forced to migrate through adjacent longitudinally extending walls to the outlet passages. It is through this exemplary wall flow mechanism that the exhaust gas 122 is filtered of carbon (soot) and other particulates. The filtered particulates are deposited on the longitudinally extending walls of the inlet passages and, over time, will have the effect of increasing the exhaust gas backpressure experienced by the internal combustion engine 100. It should be understood that the ceramic wall flow monolith filter is merely exemplary in nature and that the PF 130 may include other filter devices such as wound or packed fiber filters, open cell foams, sintered metal fibers, etc.

The accumulation of particulate matter within the PF 130 is periodically cleaned, or regenerated to reduce backpressure. Regeneration involves the oxidation or burning of the accumulated carbon and other particulates (also referred to as "soot") in what is typically a high temperature (e.g., at or above 600° C.) environment. In an embodiment, an elevated soot level is sensed in the PF 130 and a regeneration process may be performed. In an embodiment, the control module 110 determines loading of soot in the PF 130. The regeneration process may involve several components and have one or more stages. In one embodiment, the regeneration process includes an introduction of excess thermal energy into the exhaust aftertreatment system 106 by introducing fuel (hydrocarbons or HC) via an injector, such as hydrocarbon injector ("HCI") 154 directly into the exhaust gas 122 as it flows into catalysts, such as OC device 126 and SCR device 128. A selected amount of fuel is directed from the HCI 154 into the exhaust gas 122 and is oxidized in an exothermic reaction in the OC device 126, causing an increase in the temperature of the exhaust gas flow 122 into the PF 130. In the depicted embodiment, the control module 110 is coupled to the HCI 154 and is configured to control the amount of fuel to be directed into the exhaust gas flow 12 exhaust gas flow 122, wherein the resulting increased exhaust gas temperature burns the trapped soot particles downstream within the PF 130.

In an embodiment, the regeneration process may include a heating device 150 controlled by the control module 110, wherein operation of the heating device 150 is based on sensed elevated soot levels. When the determined soot level achieves a threshold level (e.g., 5 grams/liter of soot) and the exhaust flow rate is within a desired range, the control module controls a current sent to the heating device 150 via a power source 152 to initiate the regeneration process. The heating device 150 may be constructed of any suitable material that is electrically conductive such as a wound or stacked metal monolith. The power source 152 is connected to an electrical system, such as a vehicle electrical system, and supplies electricity to the heating device 150. The heating device 150, when heated, increases the temperature of exhaust gas 122 passing through the heating device 150 and/or increases the temperature of portions of the filter 130 at or near the heating device 150. The duration of the regeneration process varies based upon the amount of particulate matter within the PF 130. In one aspect, current is only applied during an initial portion of the regeneration process. More specifically, the current is directed to the heating device 150 which heats the inlet of the PF 130 for a selected period (e.g., 1-2 minutes). The remainder of the regeneration process is achieved using the heat generated by combustion of particulate matter present in the PF 130.

Regeneration methods may also involve the injection of fuel into the exhaust gas flow 122 after the main combustion event within the cylinders 114. This process may be referred to as post-injection or late post-injection of fuel, wherein the fuel system 156 provides the selected amount of fuel into cylinders 114 to add to the exhaust gas flow 122 for combustion within the exhaust system 106. The post-combustion injected fuel is oxidized in the OC device 126, in the exhaust system 106. The heat released from the oxidation increases the exhaust temperature, which burns the trapped soot particles in the PF 130. The control module 110 controls the amount of fuel provided by the fuel system 156 during the post-injection process. The selected amount of fuel injected for post-injection may be determined by the control module 110 based on various information, such as determined parameters (e.g., exhaust gas temperatures), component specifications and system configuration.

In an exemplary internal combustion engine 100, the control module 110 is in signal communication with the turbocharger 108, the charge cooler 144, the power source 152, HCI 154, the fuel system 156, sensors 158, and the exhaust system 106, wherein the control module 110 is configured to use various signal inputs to control various processes. In embodiments, the control module 110 is coupled to and configured to receive signal inputs from sensors 158 that includes information, such as temperature (intake system, exhaust system, engine coolant, ambient, etc.), pressure, exhaust flow rates, soot levels, NOx concentrations, exhaust gas constituencies (chemical composition) and other parameters. The control module 110 is configured to perform selected processes or operations based on the sensed parameters, such as regeneration processes based on elevated soot levels in the particulate filter 130. Exemplary sensors 158 are positioned at an outlet of the turbocharger 108, an inlet of the OC device 126 and an inlet of the SCR device 128. In one embodiment, the control module 110 determines a specific heat of exhaust gas 122 flowing into the OC device 126 inlet based on determined air/fuel ratio and a measured temperature of the exhaust gas 122 entering the OC device. The determined specific heat at the OC device 126 is used to determine and model exhaust gas 122 temperatures downstream of the OC device 126 more accurately, which can lead to improved exhaust component control.

In embodiments, the control module 110 uses at least one of, the post-injection process via fuel system 156, HCI 154 and heating device 150, to initiate regeneration of the PF 130. An exemplary system accurately determines specific heat to improve a temperature determination of the exhaust gas received by the PF 130, which is used to control processes in the exhaust system 106. The improved temperature determination improves control over the regeneration of the PF 130, wherein the accurate temperature determination is used to control one or more methods of regeneration. An exemplary determination of specific heat includes utilizing one or more inputs, including properties of the exhaust gas 122 in selected segments of the system. The determined specific heat may then be used to determine or model other exhaust gas 122 parameters in the system. For example, the relationship of specific heat, temperature and other exhaust gas properties may be described by the following equation, $$Q = m \cdot C_P \cdot \Delta T \quad (1)$$

wherein the following values relate to exhaust gas at the selected location: Q=change in heat/energy supplied to exhaust gas to attain the desired temperature, m=mass flow rate of exhaust gas, $C_p$=specific heat capacity of the exhaust gas and $\Delta T$=temperature rise of the exhaust gas to the desired temperature.

In one example, the energy needed (Q) to raise the temperature to a desired temperature ($\Delta T$) is calculated for the exhaust flow rate (m). In the example, exhaust flow rate (m), the temperature difference ($\Delta T$) and specific heat ($C_p$) are used to determine the energy needed (Q) to attain the desired exhaust gas 122 temperature. The exhaust flow rate (m) is known and specific heat ($C_p$) is determined based on exhaust gas constituents and their distinct specific heat ($C_p$) properties, as described in detail below. The improved determination of specific heat ($C_p$) provides an accurate input for models or calculations. Specifically, for equation 1 above, the improve specific heat determination reduces error in determining the energy needed (Q) or energy requested by the controller for a process, such as regeneration. The increase in accuracy of specific heat ($C_p$) determination leads to rapid and accurate open loop (using measured and determined values) operation of exhaust system temperature control.

In an embodiment, the exhaust system 106 is divided into segments, where each segment has a specific heat and corresponding temperature determination. A turbocharger segment 170 is the portion of the exhaust system 106 between the turbocharger 108 outlet and the OC device 126 inlet. The OC device 126 is considered the next or downstream segment, wherein specific heat and temperature determinations for the OC device 126 segment are based on previously determined specific heat and/or temperature values from the turbocharger segment 170. An OC-SCR segment 172 is disposed between the OC device 126 outlet and the SCR device 128 inlet. Specific heat and temperature determinations for the OC-SCR segment 172 are based on previously determined values specific heat and/or temperature from the turbocharger segment 170 and the OC device 126 segment. An SCR device 128 segment is downstream of the OC-SCR segment 172. Specific heat and temperature determinations for the SCR device 128 segment are based on previously determined specific heat and/or temperature values from the turbocharger segment 170, the OC device 126 segment and OC-SCR segment 172. An SCR-PF segment 174 is disposed between the SCR device 128 outlet and the PF 130 inlet. Specific heat and temperature determinations for the SCR-PF segment 174 are based on previously determined specific heat and/or temperature values from the turbocharger segment 170, the OC device 126 segment, OC-SCR segment 172 and SCR device 128 segment.

Accordingly, in an embodiment, improved accuracy in determining specific heat and temperature of exhaust gas 122 in the turbocharger segment 170 will improve specific heat and temperature determinations downstream, including an improved temperature determination of exhaust gas flow 122 at the SCR-PF segment 174. In addition, improved temperature determination of exhaust gas flow 122 entering the PF 130 will lead to an accurate determination of energy needed to perform regeneration of the PF 130 using the methods described above. The determination of regeneration energy is used by a control module 110 to send control commands to components, such as commands regeneration using the HCI 154 or heating device 150. Thus, the determined specific energy and temperature values for exhaust gas flow 122 entering the PF 130 leads to improved efficiency and control of regeneration and associated system components.

Figure 2:
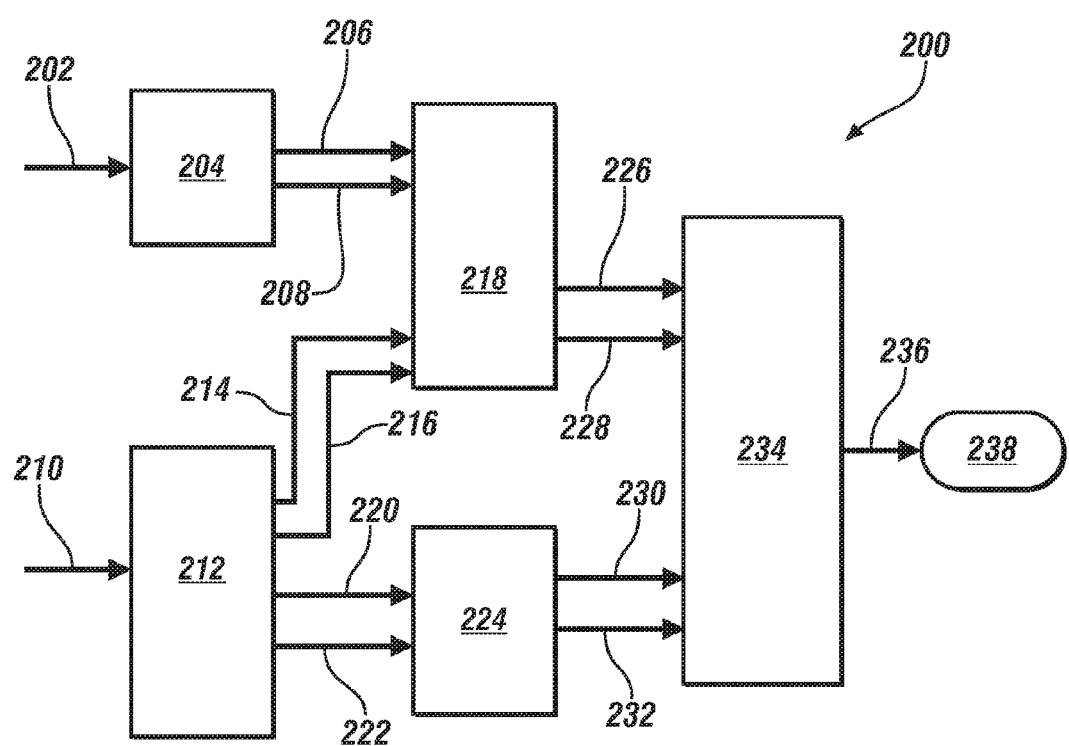
FIG. 2 is a diagram of an exemplary method and system for determining a specific heat and temperature for exhaust gas in the exemplary internal combustion engine and associated exhaust system shown in FIG. 1.

FIG. 2 is a diagram 200 of a method and system for determining a specific heat and temperature, wherein the determined temperature is used to control an exemplary exhaust system, such as the exhaust system 106 (FIG. 1). For ease of explanation, the diagram 200 will be discussed in relation to a temperature and specific heat for the exhaust gas 122 within turbocharger segment 170 (also referred to as "selected location"), wherein these values may be used to determine other exhaust gas parameters downstream. An air-fuel parameter 202 represents a value of a determined air to fuel ratio in the engine's combustion chamber divided by a stoichiometric air to fuel ratio. In an embodiment, the stoichiometric air to fuel ratio is the ratio at which the exact amount of air is provided to completely burn all of a specific quantity of fuel. The air to fuel ratio in the combustion chamber may be determined by any suitable method, such as using sensors, models and/or equations. In one embodiment, the air to fuel ratio is determined based on a measurement of oxygen proximate the turbocharger segment 170, wherein the oxygen measurement at the location is used to determine the air to fuel ratio upstream in the combustion chamber. The block 204 receives the air-fuel parameter 202 and determines a $CO_2$ proportion 206 and $O_2$ proportion 208 of the exhaust gas at the selected location. In an embodiment, the proportions are percentages, wherein the total of the $CO_2$ proportion 206 and $O_2$ proportion 208 is about 0.20 or 20%. In an embodiment, other constituents of the exhaust gas at the selected location may include $N_2$ and $H_2O$.

A local exhaust temperature parameter 210 represents a temperature value for the exhaust gas 122 at the selected location, such as proximate an outlet of the turbocharger segment 170. The local exhaust temperature parameter 210 may be determined by a suitable method, including, but not limited to, sensor measurements and/or modeling. A specific heat block 212 receives the local exhaust temperature parameter 210 and determines specific heat values for exhaust gas constituents at the local exhaust temperature. The specific heat values may be determined by using a look up table, equation and/or model. The resulting values are as follows, $O_2$ specific heat value 214, $CO_2$ specific heat value 216, $N_2$ specific heat value 220 and $H_2O$ specific heat value 222. The $O_2$ specific heat value 214 and $CO_2$ specific heat value 216 are received along with $CO_2$ proportion 206 and $O_2$ proportion 208 by a proportional specific heat block 218. The proportional specific heat block 218 multiplies the $CO_2$ proportion 206 by the $CO_2$ specific heat value 216 while the $O_2$ proportion 208 is multiplied by $O_2$ specific heat value 214. The results of the operations are an $O_2$ proportional specific heat 226 and $CO_2$ proportional specific heat 228.

A gain block 224 receives the $N_2$ specific heat value 220 and $H_2O$ specific heat value 222 and multiplies each value by a gain value corresponding to the proportion of each constituent ($N_2$ and $H_2O$) at the selected location. In an embodiment, the gain values for $N_2$ and $H_2O$ are percentages, wherein the percentages total about 0.80 or 80%. For example, in an embodiment, the gain value for $N_2$ is about 0.75 and the gain value for $H_2O$ is about 0.05. The sum of the gain values used in gain block 218, $CO_2$ proportion 206 and $O_2$ proportion 208 is a total of 0.20 or 20%, wherein exhaust gas constituents used to determined specific heat are represented by proportion or gain values. The resulting values from gain block 224 operations are an $N_2$ proportional specific heat 230 and $H_2O$ proportional specific heat 232, wherein the values are received by a summation block 234. The summation block 234 receives the $O_2$ proportional specific heat 226, $CO_2$ proportional specific heat 228, $N_2$ proportional specific heat 230 and $H_2O$ proportional specific heat 232 to produce a total specific heat value 236 for the selected location in the exhaust system 106. In an embodiment, the total specific heat value 236 is used by the control module 110 to determine a temperature for one or more locations in the exhaust system 106. The determined temperature is then used to provide commands in a command block 238 to control selected components of the exhaust system via signals from the command block 238. For example, the command block 238 generates a command signal to control at least one of: an amount of current sent to heating device 150, an amount of fuel to be supplied by HCI 154 into the exhaust gas and/or an amount of fuel to be injected by the fuel system 156 as part of a post-injection process.

Accordingly, the exemplary system and method provide improved control over exhaust system 106 processes, such as regeneration of PF 130, wherein the specific heat determination provides information used to control components used for regeneration. In an embodiment, a first specific heat is determined for the turbocharger segment 170, which is then used to determine a first exhaust gas temperature for the segment. The first exhaust gas temperature may then be used to determine downstream specific heat values and corresponding temperatures using suitable equations and processes, such as equation 1. In an example, specific of exhaust gas 122 entering the OC device 126 is determined by the process shown in FIG. 2, wherein the specific heat is then used to determine heat loss and temperature of the exhaust gas 122 downstream entering the SCR device 128 using equation 1 and other determined and/or known parameters. The temperature values at selected locations in the exhaust system 106 may then be used for exhaust system 106 control and process control. In an embodiment, the temperature of the exhaust gas 122 entering the PF 130 is determined based on the specific heat at the OC device 126, wherein the temperature is used to determine the amount of energy needed for a PF regeneration process. Thus, by providing improved accuracy for specific heat and corresponding temperatures in selected locations in the system, exhaust system processes are more efficient. For example, improved accuracy for determining temperature and specific heat will cause the regeneration process to be performed closer to the proper operating temperature for regeneration. Accordingly, a reduced amount of fuel/power is used, due to improved accuracy for the amount of power needed, as compared to systems that heat the exhaust gas to a temperature that has a safety factor (e.g., 5%-10% over the regeneration initiation temperature) to account for inaccuracies in determining temperatures. Thus, fuel and/or energy are saved by the improved temperature determinations of the exemplary method and system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust system comprising:
   a temperature sensor;
   a particulate filter downstream of the temperature sensor; and
   a controller coupled to the temperature sensor, the controller configured to perform a method, the method comprising:
   determining an air to fuel ratio within a combustion chamber of an internal combustion engine;
   measuring a temperature of an exhaust gas from the internal combustion engine using the temperature sensor;
   separately determining a specific heat for each of a plurality of constituents of the exhaust gas in a first segment of the exhaust system based on the temperature of the exhaust gas from the internal combustion engine and the air to fuel ratio, wherein the first segment is upstream of the particulate filter;

determining a specific heat for the exhaust gas by adding up the plurality of specific heats for the plurality of constituents of the exhaust gas;

determining a first temperature of the exhaust gas in the first segment based on the specific heat for the exhaust gas;

determining an energy needed to attain a desired temperature of the exhaust gas based on the specific heat and the first temperature; and selectively controlling a regeneration process for the particulate filter based on the determined energy in order to raise the temperature of the exhaust gas at an inlet of the particulate filter to the desired temperature, the regeneration process including at least one of: a post-injection of fuel into a cylinder, a hydrocarbon injection into the exhaust system and heating the particulate filter via a heating device.

2. The exhaust system of claim 1 further comprising an oxidation catalyst upstream of the particulate filter, wherein the first segment comprises a portion of the exhaust system proximate an inlet of the oxidation catalyst.

3. The exhaust system of claim 2 further comprising a second segment downstream of the first segment, wherein the method further comprises determining a second temperature of the exhaust gas in the second segment based on the specific heat for the exhaust gas.

4. The exhaust system of claim 3, wherein the second segment comprises the inlet of the particulate filter.

5. The exhaust system of claim 3, wherein the temperature sensor is located in the first segment.

6. The exhaust system of claim 1, wherein the plurality of constituents of the exhaust gas comprise at least two of oxygen, $CO_2$, $N_2$, and $H_2O$.

7. A method for controlling an exhaust system comprising:
determining an air to fuel ratio within a combustion chamber of an internal combustion engine;
measuring a temperature of an exhaust gas from the internal combustion engine into the exhaust system;
separately determining a specific heat for each of a plurality of constituents of the exhaust gas in a first segment of the exhaust system based on the temperature of the exhaust gas from the internal combustion engine and the air to fuel ratio, wherein the first segment is upstream of a particulate filter;
determining a specific heat for the exhaust gas by adding up the plurality of specific heats for the plurality of constituents of the exhaust gas;
determining a first temperature of the exhaust gas in the first segment based on the specific heat for the exhaust gas;
determining an energy needed to attain a desired temperature of the exhaust gas based on the specific heat and the first temperature; and
selectively controlling a regeneration process for the particulate filter based on the determined energy in order to raise the temperature of the exhaust gas at an inlet of the particulate filter to the desired temperature by performing at least one of: post-injection of fuel into a cylinder, hydrocarbon injection into the exhaust system and heating the particulate filter via a heating device.

8. The method of claim 7, wherein determining the specific heat for the exhaust gas comprises determining specific heat for the exhaust gas in the first segment that comprises a portion of the exhaust system proximate an inlet of an oxidation catalyst, wherein the oxidation catalyst is upstream of the particulate filter.

9. The method of claim 8, wherein the exhaust system further comprises a second segment downstream of the first segment, wherein the method further comprises determining a second temperature for the second segment based on the specific heat for the exhaust gas.

10. The method of claim 9, wherein determining the temperature of the exhaust gas in the second segment comprises determining the temperature of the exhaust gas at the inlet of the particulate filter.

11. The method of claim 7 wherein measuring the temperature of the exhaust gas from the internal combustion engine comprises using a temperature sensor located in the first segment to measure the temperature of the exhaust gas from the internal combustion engine.

12. The method of claim 7, wherein the plurality of constituents of the exhaust gas comprise at least two of oxygen, $CO_2$, $N_2$, and $H_2O$.

13. The method of claim 7, wherein separately determining the specific heat for each of the plurality of constituents of the exhaust gas comprises:
determining a proportion of each of the plurality of constituents of the exhaust gas in the exhaust gas based on the air to fuel ratio;
determining a specific heat value for each of the plurality of constituents at the temperature of the exhaust gas; and
determining the specific heat for each of the plurality of constituents based on the proportion and the specific heat value for the constituent.

14. The exhaust system of claim 1, wherein separately determining the specific heat for each of the plurality of constituents of the exhaust gas comprises:
determining a proportion of each of the plurality of constituents of the exhaust gas in the exhaust gas based on the air to fuel ratio;
determining a specific heat value for each of the plurality of constituents at the temperature of the exhaust gas; and
determining the specific heat for each of the plurality of constituents based on the proportion and the specific heat value for the constituent.

15. The exhaust system of claim 1, wherein the separately determining the specific heat for each of the plurality of constituents comprises:
determining a $CO_2$ proportion and a $O_2$ proportion of the exhaust gas in the first segment based on the air to fuel ratio;
determining a $CO_2$ specific heat value and a $O_2$ specific heat value based on the measured temperature of the exhaust gas;
determining a specific heat for $CO_2$ by multiplying the $CO_2$ proportion by the $CO_2$ specific heat value; and
determining a specific heat for $O_2$ by multiplying the $O_2$ proportion by the $O_2$ specific heat value.

16. The exhaust system of claim 1, wherein the separately determining the specific heat for each of the plurality of constituents comprises:
determining a $N_2$ specific heat value and a $H_2O$ specific heat value based on the measured temperature of the exhaust gas;
determining a specific heat for $N_2$ by multiplying the $N_2$ specific heat value by a gain value corresponding to $N_2$; and
determining a specific heat for $H_2O$ by multiplying the $H_2O$ specific heat value by a gain value corresponding to $H_2O$.

17. The method of claim 7, wherein the separately determining the specific heat for each of the plurality of constituents comprises:
- determining a $CO_2$ proportion and a $O_2$ proportion of the exhaust gas in the first segment based on the air to fuel ratio;
- determining a $CO_2$ specific heat value and a $O_2$ specific heat value based on the measured temperature of the exhaust gas;
- determining a specific heat for $CO_2$ by multiplying the $CO_2$ proportion by the $CO_2$ specific heat value; and
- determining a specific heat for $O_2$ by multiplying the $O_2$ proportion by the $O_2$ specific heat value.

18. The method of claim 7, wherein the separately determining the specific heat for each of the plurality of constituents comprises:
- determining a $N_2$ specific heat value and a $H_2O$ specific heat value based on the measured temperature of the exhaust gas;
- determining a specific heat for $N_2$ by multiplying the $N_2$ specific heat value by a gain value corresponding to $N_2$; and
- determining a specific heat for $H_2O$ by multiplying the $H_2O$ specific heat value by a gain value corresponding to $H_2O$.

* * * * *